United States Patent
Yamada

(10) Patent No.: US 12,491,860 B2
(45) Date of Patent: Dec. 9, 2025

(54) HYBRID ELECTRIC VEHICLE

(71) Applicant: TOYOTA JIDOSHA KABUSHIKI KAISHA, Toyota (JP)

(72) Inventor: Yuki Yamada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 18/760,254

(22) Filed: Jul. 1, 2024

(65) Prior Publication Data

US 2025/0100542 A1    Mar. 27, 2025

(30) Foreign Application Priority Data

Sep. 26, 2023   (JP) ................................ 2023-163646

(51) Int. Cl.
*B60W 20/17*     (2016.01)
*B60W 10/06*     (2006.01)
*B60W 10/08*     (2006.01)

(52) U.S. Cl.
CPC ............ *B60W 20/17* (2016.01); *B60W 10/06* (2013.01); *B60W 10/08* (2013.01)

(58) Field of Classification Search
CPC ....... B60W 20/17; B60W 10/06; B60W 10/08
See application file for complete search history.

(56) References Cited

U.S. PATENT DOCUMENTS

| | | | | |
|---|---|---|---|---|
| 2015/0127199 | A1* | 5/2015 | Zhao | B60W 50/0097 |
| | | | | 701/22 |
| 2016/0229389 | A1* | 8/2016 | Hirano | G01C 21/3492 |
| 2019/0323848 | A1* | 10/2019 | Kurihashi | G01C 21/3415 |
| 2019/0381993 | A1* | 12/2019 | Park | B60W 50/0097 |

FOREIGN PATENT DOCUMENTS

| | | |
|---|---|---|
| JP | H06-187595 A | 7/1994 |
| JP | 3169100 B2 | 5/2001 |

* cited by examiner

*Primary Examiner* — Naeem Taslim Alam
(74) *Attorney, Agent, or Firm* — SoraIP. Inc.

(57) ABSTRACT

A control device for a hybrid electric vehicle is configured to perform drive assistance control that causes the hybrid electric vehicle to travel based on a drive assistance plan in which a motor drive mode or a normal drive mode is assigned to each of travel sections of a travel route using information on the travel sections, the travel route being a planned or estimated travel route based on map information and the location of the hybrid electric vehicle. When the travel sections of the travel route include a specific travel section having a motor-driving designated point, the control device divides the specific travel section into two travel sections at the motor-driving designated point based on a predetermined condition and performs the drive assistance control, the motor-driving designated point being a point at which the hybrid electric vehicle is supposed to arrive by motor driving.

5 Claims, 3 Drawing Sheets

FIG. 4

HYBRID ELECTRIC VEHICLE

CROSS-REFERENCE TO RELATED APPLICATION

This application claims priority to Japanese Patent Application No. 2023-163646 filed on Sep. 26, 2023, incorporated herein by reference in its entirety.

BACKGROUND

1. Technical Field

The present disclosure relates to hybrid electric vehicles.

2. Description of Related Art

Conventionally, there has been proposed a hybrid electric device that switches among the following three modes according to the mode-switch vehicle speed: an electric motor mode in which the hybrid electric vehicle runs on an electric motor alone, an engine mode in which the hybrid electric vehicle runs on an engine alone, and a combined mode in which the vehicle runs on both the electric motor and the engine (e.g., Japanese Unexamined Patent Application Publication No. 06-187595 (JP 06-187595 A)). This hybrid electric vehicle changes the mode-switch vehicle speed according to the environment such as an urban area, a suburban area, an expressway, or a tunnel so that the hybrid electric vehicle can perform driving adapted to the environment.

SUMMARY

In recent years, there have been cases where a user sets a motor drive area around his or her home in order to reduce noise around his or her home. In such cases, the motor drive area is set for a travel section on a map. When creating a drive assistance plan with home as a destination, motor driving is assigned to a travel section including the home. Accordingly, when the home is located at an intermediate position in the travel section, the drive assistance plan is created so that the vehicle will perform motor driving even in a portion of the travel section after the home. It is therefore not possible to create a more appropriate drive assistance plan.

A primary object of a hybrid electric vehicle of the present disclosure is to create a more appropriate drive assistance plan.

In order to achieve the primary object, the hybrid electric vehicle of the present disclosure adopts the following measures.

The hybrid electric vehicle of the present disclosure includes: an engine configured to output power for traveling; a motor configured to output power for traveling; an energy storage device configured to supply and receive electric power to and from the motor; and a control device configured to perform drive assistance control when controlling the engine and the motor by switching between a motor drive mode in which the hybrid electric vehicle performs motor driving and a normal drive mode in which the hybrid electric vehicle performs normal driving, the motor driving being driving in which the hybrid electric vehicle runs on the power from the motor with the engine stopped, the normal driving being driving in which the hybrid electric vehicle runs on the power from the engine and the power from the motor as necessary, the drive assistance control being control that causes the hybrid electric vehicle to travel based on a drive assistance plan in which the motor drive mode or the normal drive mode is assigned to each of travel sections of a travel route using information on the travel sections, and the travel route being a planned or estimated travel route based on map information and a location of the hybrid electric vehicle, wherein when the travel sections of the travel route include a specific travel section having a motor-driving designated point, the control device divides the specific travel section into two travel sections at the motor-driving designated point based on a predetermined condition and performs the drive assistance control, the motor-driving designated point being a point at which the hybrid electric vehicle is supposed to arrive by the motor driving.

The hybrid electric vehicle of the present disclosure includes: the engine configured to output power for traveling; the motor configured to output power for traveling; the energy storage device configured to supply and receive electric power to and from the motor; and the control device configured to control the engine and the motor by switching between the motor drive mode in which the hybrid electric vehicle performs motor driving and the normal drive mode in which the hybrid electric vehicle performs normal driving, the motor driving being driving in which the hybrid electric vehicle runs on the power from the motor with the engine stopped, and the normal driving being driving in which the hybrid electric vehicle runs on the power from the engine and the power from the motor as necessary. The control device is configured to perform the drive assistance control that causes the hybrid electric vehicle to travel based on the drive assistance plan in which the motor drive mode or the normal drive mode is assigned to each of the travel sections of the travel route using the information on the travel sections, the travel route being a planned or estimated travel route based on the map information and the location of the hybrid electric vehicle. When the travel sections of the travel route include the specific travel section having the motor-driving designated point, the control device divides the specific travel section into two travel sections at the motor-driving designated point based on the predetermined condition and performs the drive assistance control, the motor-driving designated point being a point at which the hybrid electric vehicle is supposed to arrive by the motor driving. The drive assistance plan can thus be created using the two travel sections into which the specific travel section having the motor-driving designated point, namely the point at which the hybrid electric vehicle is supposed to arrive by the motor driving, has been divided at the motor-driving designated point. As a result, the drive assistance plan can be more appropriately created than in the case where the drive assistance plan is created using the specific travel section as one travel section.

In the hybrid electric vehicle of the present disclosure, the control device may divide the specific travel section into two travel sections at the motor-driving designated point when a first condition is satisfied as the predetermined condition, the first condition being that the motor-driving designated point is a set or estimated destination or additional destination. The drive assistance plan can thus be created using only the travel section reaching the motor-driving designated point out of the two travel sections. In this case, the control device may set a first travel section of the two travel sections of the specific travel section as a motor drive section when the first condition is satisfied as the predetermined condition.

In hybrid electric vehicle of the present disclosure, the control device may not divide the specific travel section at the motor-driving designated point when a second condition is satisfied as the predetermined condition, the second condition being that the motor-driving designated point is an intermediate waypoint before a set destination. Processing can thus be more appropriately performed both when the motor-driving designated point is a destination and when the motor-driving designated point is an intermediate waypoint. In this case, the control device may perform the drive assistance control without using the specific travel section as a motor drive section when the second condition is satisfied as the predetermined condition.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram illustrating a hybrid ECU 50 as a block;

DETAILED DESCRIPTION OF EMBODIMENTS

Figure 1:
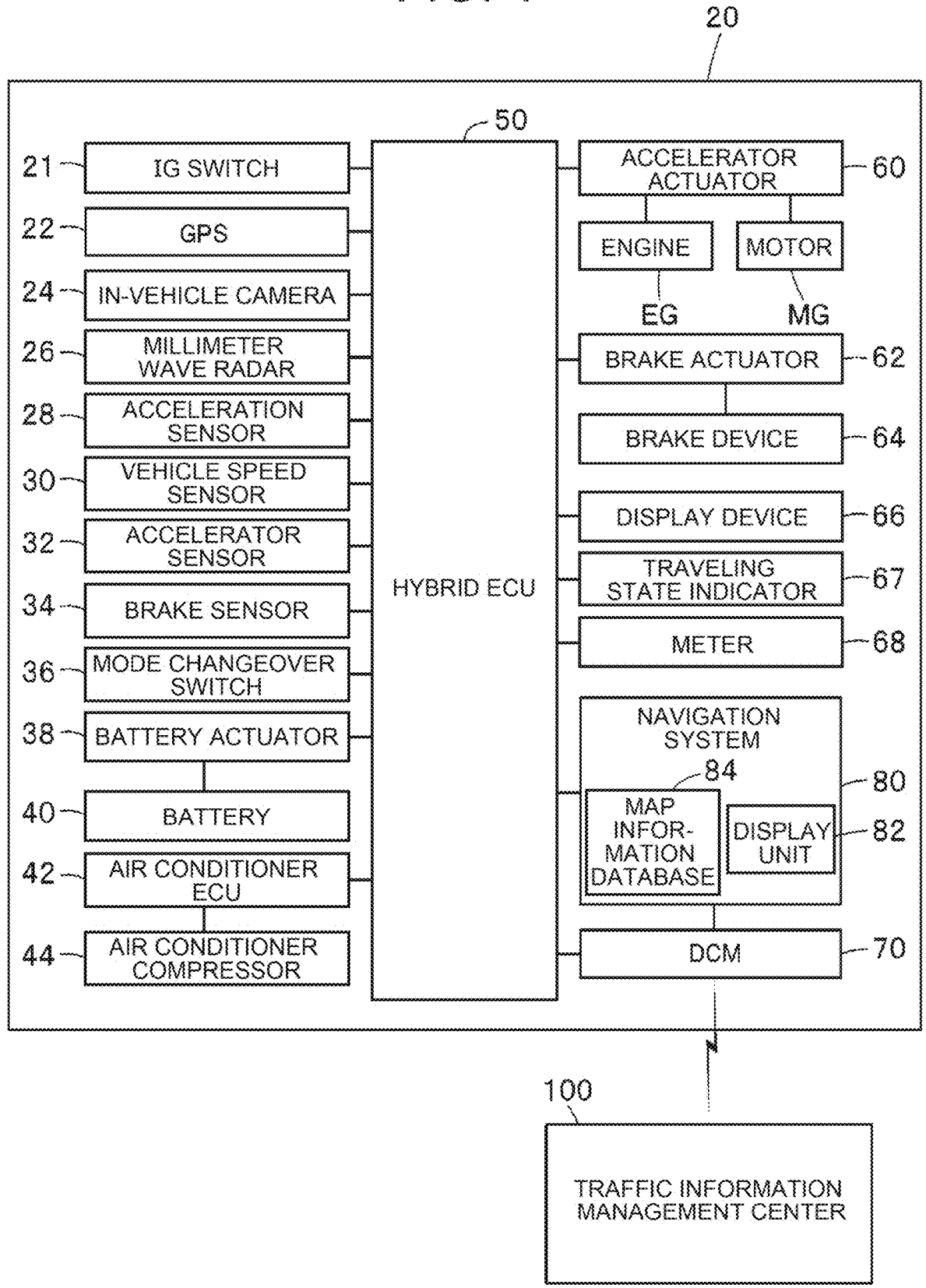
FIG. 1 is a block diagram illustrating an exemplary hybrid electric vehicle 20 as an embodiment of the present disclosure.

Next, a mode (embodiment) for carrying out the present disclosure will be described. FIG. 1 is a block diagram illustrating an exemplary hybrid electric vehicle 20 according to an embodiment of the present disclosure, with a hybrid electronic control unit (hereinafter, referred to as a hybrid ECU) 50 as a center. Hybrid electric vehicle 20 of the embodiment comprises an engine EG and a motor MG as a power source, as shown. Hybrid electric vehicle 20 of the embodiment has a motor drive mode and a normal drive mode as the running modes. In the motor drive mode, hybrid electric vehicle 20 travels by power from the motor MG while the operation of the engine EG is stopped. In the normal drive mode, the engine EG is operated as needed, and hybrid electric vehicle 20 travels by the power from the engine EG and the power from the motor MG. In the normal drive mode, there is a Charge Depleting mode (CD mode) in which electric running is prioritized so as to reduce the state of charge SOC of the battery 40. Further, in the normal drive mode, there is also a Charge Sustaining mode (CS mode) in which the electric running and the hybrid running are used together so as to maintain the state of charge SOC of the battery 40 at the target ratio.

Hybrid electric vehicle 20 of embodiments include, in addition to sources of power, an ignition switch 21, an Global Positioning System (Global Positioning Satellite, GPS) 22, an in-vehicle camera 24, a millimeter wave radar 26, an acceleration sensor 28, a vehicle speed sensor 30, an accelerator sensor 32, a brake sensor 34, a mode changeover switch 36, a battery actuator 38, a battery 40, an electronic control unit for an air conditioner (hereinafter, air conditioner ECU) 42, an air conditioner compressor 44, a hybrid ECU 50, an accelerator actuator 60, a brake actuator 62, a brake device 64, a display device 66, a traveling state indicator 67, a meter 68, a Data Communication Module (DCM) 70, a navigation system 80, and the like.

GPS 22 is a device that detects the location of the vehicle based on signals transmitted from a plurality of GPS satellites. The in-vehicle camera 24 is a camera that images the surroundings of the vehicle, and includes, for example, a front camera that images the front of the vehicle, and a rear camera that images the rear of the vehicle. The millimeter wave radar 26 detects the inter-vehicle distance and relative speed between a host vehicle and a vehicle in front, and the inter-vehicle distance and relative speed between the host vehicle and a vehicle behind.

The acceleration sensor 28 is, for example, a sensor that detects acceleration in the longitudinal direction of the vehicle, or detects acceleration in the right-left direction (lateral direction) of the vehicle. The vehicle speed sensor 30 detects a vehicle speed based on a wheel speed and the like. The accelerator sensor 32 detects an accelerator operation amount depending on the amount of depression of an accelerator pedal by a driver. The brake sensor 34 detects a brake position as the amount of depression of a brake pedal by the driver. The mode changeover switch 36 is disposed in the vicinity of the steering wheel of the driver's seat, and is a switch for switching between the motor drive mode and the normal drive mode.

The battery actuator 38 detects the state of the battery 40, such as voltage across terminals, charging/discharging current, and battery temperature, and manages the battery 40 based on these. The battery actuator 38 calculates a state of charge SOC as a ratio of the remaining energy storage capacity to the total energy storage capacity based on the charge/discharge current. Further, the battery actuator 38 calculates an allowable maximum output power (output limit Wout) that may be output from the battery 40 and an allowable maximum input power (input limit Win) that may be input to the battery 40 based on the state of charge SOC, the battery temperature, and the like. The battery 40 is configured as a rechargeable and dischargeable secondary battery, and can be, for example, a lithium ion battery, a nickel metal hydride battery, a lead acid battery, or the like.

The air conditioner ECU 42 is configured as a microcomputer centered on a central processing unit (CPU) (not shown), and includes a read-only memory (ROM), a random access memory (RAM), a flash memory, an input port, an output port, a communication port, etc. in addition to the CPU. The air conditioner ECU 42 is incorporated in an air conditioner that air-conditions a passenger compartment, and drives and controls the air conditioner compressor 44 in the air conditioner so that the temperature of the passenger compartment becomes a set temperature.

The engine EG is configured, for example, as an internal combustion engine. The motor MG is configured as an electric motor that also functions as a generator, such as a synchronous generator-motor. The motor MG is connected to the battery 40 via an inverter (not shown), and can output driving force using power supplied from the battery 40 and charge the battery 40 with generated power.

The hybrid ECU 50 is configured as a microcomputer centered on a CPU (not shown), and includes, in addition to the CPU, a ROM, a RAM, a flash memory, an input port, an output port, a communication port, and the like. The hybrid ECU 50 sets the traveling mode, and sets a target operation point (target rotation speed and target torque) for the engine EG and a torque command for the motor MG based on the set traveling mode, an accelerator operation amount from the accelerator sensor 32, a brake position from the brake sensor 34, and an output limit and an input limit from the battery actuator 38. Note that the hybrid ECU 50 does not start in the accessory-on state, but starts in the ready-on state.

The hybrid ECU 50 sets a required driving force and a required power on the basis of an accelerator operation amount from the accelerator sensor 32 and a vehicle speed from the vehicle speed sensor 30 when the motor is traveling. Then, the hybrid ECU 50 sets the torque command of the motor MG so as to output the required driving force and the required power to the vehicles, and transmits the set torque command to the accelerator actuator 60. The hybrid ECU 50 sets a target operation point of the engine EG and a torque command of the motor MG so as to output a required driving force and a required power to the vehicles when the hybrid vehicle is running. Then, the hybrid ECU 50 transmits the target operation point and the torque command to the accelerator actuator 60. When the brake pedal is depressed, the hybrid ECU 50 sets a required braking force based on the brake position from the brake sensor 34 and the vehicle speed from the vehicle speed sensor 30. The hybrid ECU 50 sets a regenerative torque command for regenerative control of the motor MG based on the required braking force and the vehicle speed, and sets a target braking force by the braking device. Then, the hybrid ECU 50 transmits the torque command to the accelerator actuator 60, and transmits the target braking force to the brake actuator 62.

The accelerator actuator 60 drives and controls the engine EG and the motor MG based on the target operation point and the torque command set by the hybrid ECU 50. The accelerator actuator 60 performs intake air amount control, fuel injection control, ignition control, intake valve opening/closing timing control, etc. so that the engine EG is operated at the target operation point (target rotation speed and target torque). Further, the accelerator actuator 60 performs switching control of switching elements included in the inverter for driving the motor MG so that a torque corresponding to the torque command is output from the motor MG.

The brake actuator 62 controls the brake device 64 so that the target braking force set by the hybrid ECU 50 is applied to the vehicle by the brake device 64. The brake device 64 is configured as, for example, a hydraulically driven friction brake.

The display device 66 is built into, for example, an instrument panel in front of the driver's seat, displays various types of information, and also functions as a touch panel. The traveling state indicator 67 has an EV indicator and a HV indicator (not shown). When hybrid electric vehicle 20 is running on the motor, EV indicator is turned on and HV indicator is turned off. When hybrid electric vehicle 20 is hybrid-driving, EV indicator is turned off and HV indicator is turned on. The meter 68 is built into, for example, the instrument panel in front of the driver's seat.

Data Communication Module (DCM) 70 transmits information of the own vehicle to the traffic information management center 100 and receives road traffic information from the traffic information management center 100. The information about the host vehicle includes, for example, the location of the host vehicle, vehicle speed, traveling power, and traveling mode. The road traffic information includes, for example, information on current and future traffic jams, information on current average vehicle speeds and predicted future average vehicle speeds in sections on a traveling route, information on traffic regulations, information on weather, information on road surface conditions, and information on maps. The DCM 70 communicates with the traffic information management center 100 at predetermined intervals (such as, every 30 seconds, every minute, or every two minutes).

The navigation system 80 is a system for guiding the host vehicle to a set destination, and includes a display unit 82 and a map information database 84. The display unit 82 is a functional block that has a function of displaying a route to the destination, the location of the host vehicle, etc. on the display device 66 based on map information. Navigation system 80 is in communication with a traffic information management center 100 via a Data Communication Module (DCM) 70. When a destination or an intermediate waypoint is set, the navigation system 80 sets a route based on the information on the destination or the intermediate waypoint and the information on the current location (current location of the host vehicle) acquired by GPS 22 and the information stored in the map information database 84. The navigation system 80 communicates with the traffic information management center 100 at every predetermined time (such as, every three minutes, or every five minutes) to acquire the road traffic information, and provides route guidance based on the road traffic information. The map information stored in the map information database 84 includes not only data as a map but also a road gradient, a type of a road, an altitude, and the like for each travel section.

When the navigation system 80 provides the route guidance, each time the navigation system 80 acquires road traffic information from the traffic information management center 100 (or at every predetermined time), the navigation system 80 generates, as predictive information, load information etc. necessary to travel the travel sections based on: information of each travel section within the traveling route out of the road traffic information acquired from the traffic information management center 100, information on traveling load, the vehicle speed of the host vehicle, the traveling power of the host vehicle, and the traveling mode of the host vehicle. The navigation system 80 then transmits the generated information to the hybrid ECU 50. The predictive information includes: host vehicle information such as the location, vehicle speed, traveling power, and traveling mode of the host vehicle; information on current and future traffic jams, information on current average vehicle speeds and predicted future average vehicle speeds in sections on the traveling route, information on traffic regulations, information on weather, information on road surface conditions, and information on maps. The information related to the map also includes an area (motor drive area) to which the motor is to be traveled, which is determined by a municipality or the like. The navigation system 80 can also set a motor drive area by designating an area such as an area near the home by user's operation. The navigation system 80 transmits, to the hybrid ECU 50, a signal indicating whether the vehicle is in the motor drive area when the vehicle is traveling.

Figure 2:
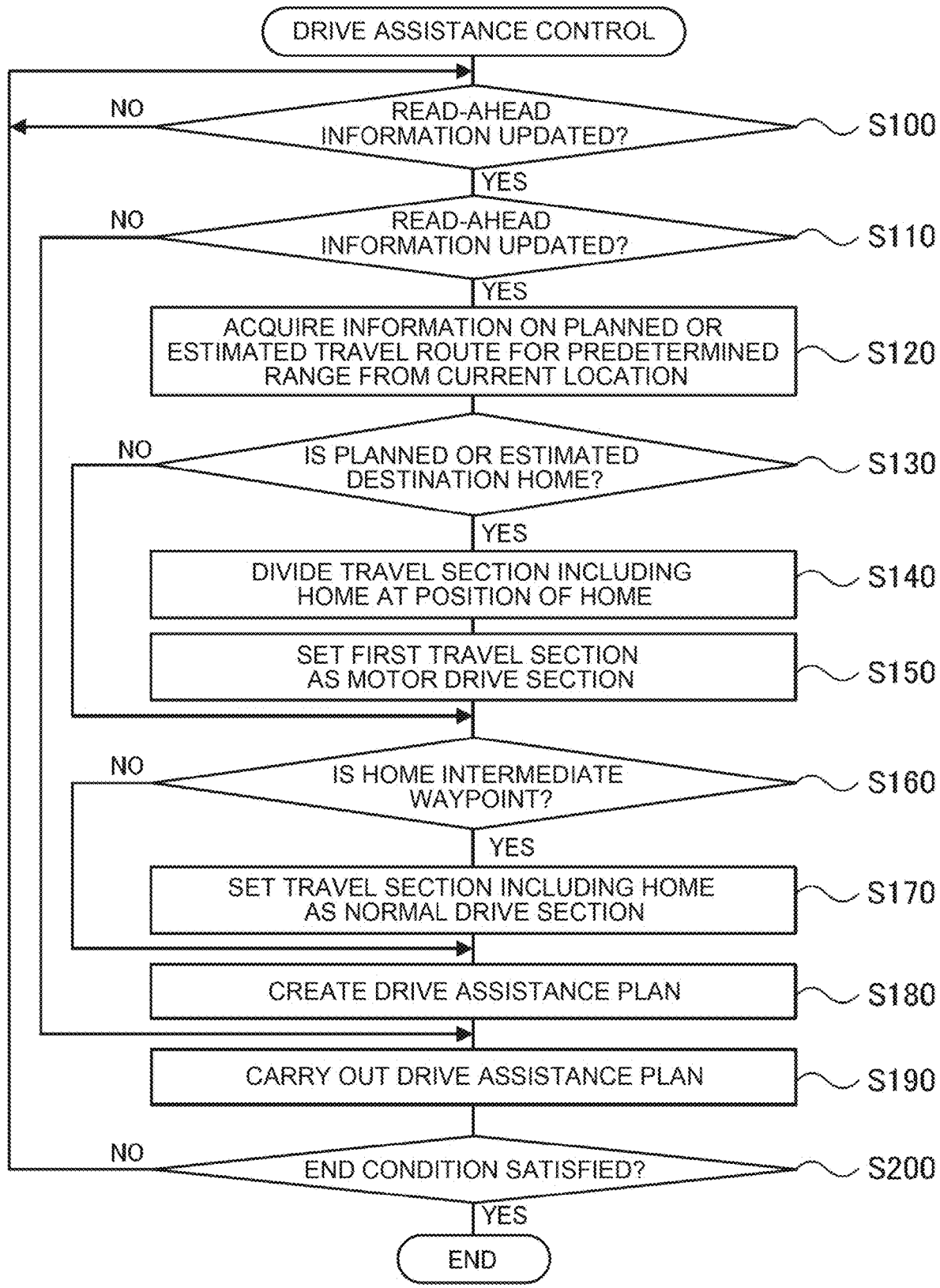
FIG. 2 is a flowchart illustrating an example of drive assistance control that is performed by the hybrid ECU 50.

Next, an operation in the hybrid electric vehicle 20 configured as described above, in particular, an operation when creating the drive assistance plan and traveling according to the created drive assistance plan will be described. FIG. 2 is a flowchart illustrating an example of the drive assistance control that is performed by the hybrid ECU 50. This flowchart is performed after the ignition switch 21 is turned on.

In the drive assistance control, the hybrid ECU 50 first determines whether the drive assistance control can be performed (S100). When the route guidance cannot be performed satisfactorily, for example, when an abnormality occurs in the navigation system 80 or when an abnormality occurs in GPS 22, the drive assistance control cannot be performed. When the battery temperature is low, the output limit Wout, which is the allowable maximum output power that may be output from the battery 40, becomes small, and even when the vehicle is traveling in CD mode, the engine EG is frequently started, and thus the vehicle cannot be properly traveled in CD mode. In S100, it is determined whether the drive assistance control can be performed according to such circumstances. When it is determined in S100 that the drive assistance control cannot be performed, the vehicle waits until the drive assistance control can be performed.

When the hybrid ECU 50 determines in S100 that the drive assistance control can be performed, it determines whether the read-ahead data sent from the navigation system 80 has been updated (S110). When the hybrid ECU 50 determines that the read-ahead information has been updated, it acquires information on a predetermined range of planned or estimated travel routes from the current location (S120). A 5 km, a 10 km, 15 km, or the like can be used as the predetermined area. The planned travel route is a travel route planned as route guidance from the current location to the destination by the navigation system 80 by setting the destination, and the estimated travel route is a travel route in which travel is estimated from the current location.

Subsequently, the hybrid ECU 50 determines whether the home is a planned destination or an estimated destination (S130). When the route guidance is performed by setting the home as the destination by the navigation system 80, the home is planned as the destination in the drive assistance plan. Further, when the vehicle is traveling toward the home while the route guidance is not being performed by the navigation system 80, it is estimated that the home is the destination. Therefore, S130 makes a positive determination when the route guidance is performed by setting the home as the destination, or when the route guidance is not performed but the vehicle travels toward the home. Here, the hybrid ECU 50 divides the travel section including the home into two travel sections at the position of the home (S140). Then, the hybrid ECU 50 sets the first travel section of the two travel sections (travel section closer to the current point) to the motor drive section where the hybrid electric vehicle runs on the motor (S150).

Figure 3:
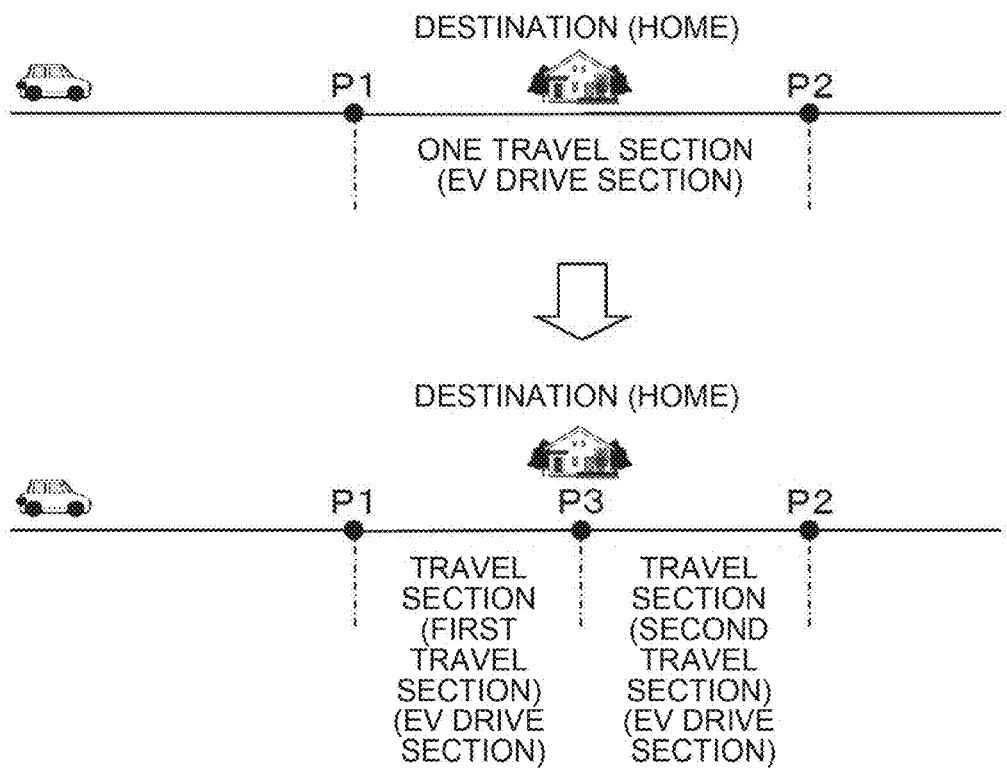
FIG. 3 is an explanatory diagram illustrating an exemplary manner of dividing a travel section including a home into two travel sections.

FIG. 3 shows an example of dividing a travel section including a home into two travel sections. As shown in the figure, the travel section is divided into two travel sections at the position of the home, and the first travel section of the two travel sections (travel section closer to the current point) is set as the motor drive section and used for the drive assistance plan. On the other hand, the second travel section (travel section farther from the current point) is not used for the drive assistance plan.

Figure 4:
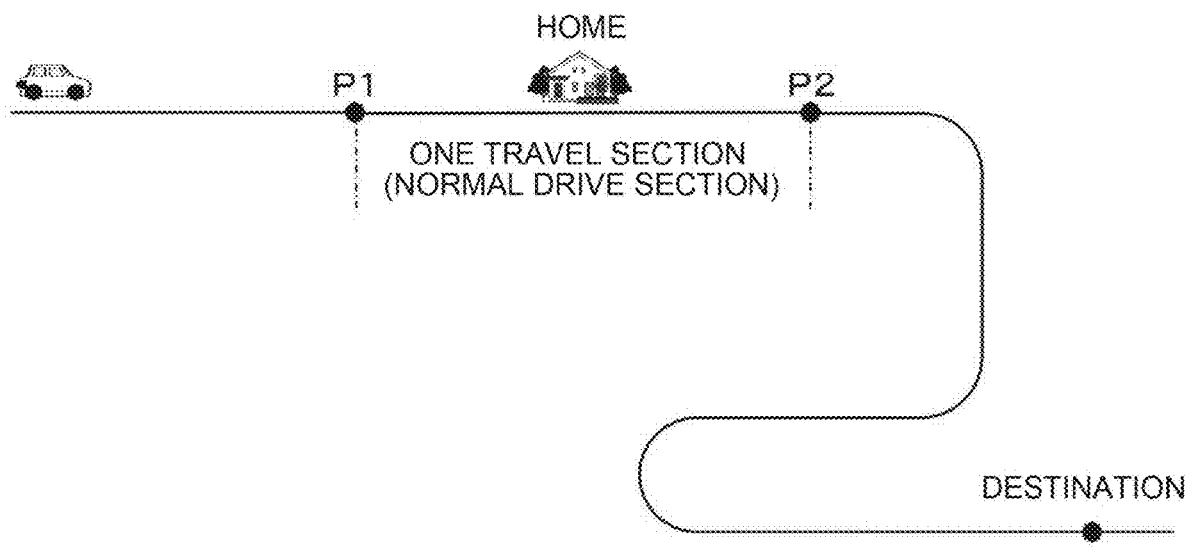
FIG. 4 is an explanatory diagram illustrating an example of a state in which a home is an intermediate waypoint to a destination.

In this way, when the hybrid ECU 50 performs a process of dividing a travel section including the home into two travel sections at the position of the home, or when the hybrid ECU 50 determines in S130 that the home is not a planned destination or an estimated destination, the hybrid ECU 50 determines whether the home is an intermediate waypoint in route guidance to the destination (S160). When it is determined that the home is an intermediate waypoint in the route guidance, a travel section including the home is set to a normal drive section (section that is not a motor drive section) (S170). In this way, setting the travel section including the home as the normal drive section is based on treating the host vehicle as being the same as the other vehicles. FIG. 4 shows an example of a state in which a home is an intermediate waypoint to a destination. In this case, since the home is an intermediate waypoint (passing point) in the route guidance to the destination, the travel section including the home is set to the normal drive section as in the case of the other vehicles.

The hybrid ECU 50 then creates the drive assistance plan (S180). For example, in the drive assistance plan, the motor drive mode is assigned to each motor drive section out of the travel sections of the travel route. For the other travel sections, the total energy Esum as the total consumption energy E(n) of each travel section of the travel route from the current location to the control end section (destination) is calculated, and the total remaining energy Eev is calculated by subtracting the consumption energy E(n) of the travel section (motor drive section) to which the motor drive mode is assigned from the total energy Esum. When the total remaining energy Eev is equal to or less than the remaining capacity of the battery 40, the CD mode is assigned to the entire travel section. When the total remaining energy Eev is larger than the remaining capacity of the battery 40, the remaining travel sections are sorted in descending order of the driving loads. The CD mode can be created by assigning the driving load in ascending order and assigning the CS mode to the remaining travel sections until the total consumption energy En of the assigned travel sections exceeds the remaining capacity of the battery 40. When the home is set as the destination, the travel section including the home is divided into two travel sections, and the first travel section set as the motor drive section out of the two travel sections is used to create the drive assistance plan. Therefore, the drive assistance plan can be more appropriately created than in the case where the drive assistance plan is created without dividing the travel section including the home into two travel sections.

Then, the hybrid ECU 50 controls the drive mode according to the drive assistance plan (S190), and determines whether the control end condition is satisfied (S200). When the hybrid ECU 50 determines that the control end condition is not satisfied, the process returns to the process of determining whether drive assistance control of S100 can be performed. When it is determined that the control end condition is satisfied, the drive assistance control is ended.

In hybrid electric vehicle 20 of the embodiment described above, when the home is a planned destination or an estimated destination, the travel section including the home is divided into two travel sections at the position of the home, and the first travel section of the two travel sections is set as the motor drive section. Then, a drive assistance plan is created using the first travel section of the two travel sections into which the travel section has been divided using the home as the planned or estimated destination. As a result, the drive assistance plan can be more appropriately created than in the case where the drive assistance plan is created using the travel section including the home.

In the hybrid electric vehicle 20 of the embodiment, when the home is an intermediate waypoint in the route guidance, the travel section including the home is used as one travel section without dividing the travel section into two travel sections, and is set as a normal drive section, and the drive assistance plan is created using the normal drive section. As a result, it is possible to more appropriately process the case where the home is the destination and the case where the home is an intermediate waypoint.

In hybrid electric vehicle 20 of the embodiment, when the home is a planned destination or an estimated destination for the travel section including the home when the vicinity of the home is set as the motor drive area, the travel section including the home is divided into two travel sections at the position of the home. However, a periphery of a predetermined specific point such as a hospital or a school may be set as a motor drive area, and when the specific point is a destination, the travel section including the specific point may be divided into two travel sections at the position of the home.

In hybrid electric vehicle 20 of the embodiment, when the home is a planned destination or an estimated destination, the travel section including the home is divided into two travel sections at the position of the home. However, even when the home is not the final destination but an intermediate additional destination, the travel section including the home may be divided into two travel sections at the position of the home.

The correspondence between the main elements of the embodiments and the main elements of the disclosure described in the column of the means for solving the problem will be described. In the embodiment, the engine EG corresponds to the "engine", the motor MG corresponds to the "motor", the battery 40 corresponds to the "energy storage device", and the hybrid electronic control unit 50 corresponds to the "control device".

Note that the correspondence between the main elements of the embodiment and the main elements of the disclosure described in the section of the means for solving the problem is an example for specifically explaining the embodiment of the disclosure described in the section of the means for solving the problem, and therefore the elements of the disclosure described in the section of the means for solving the problem are not limited. That is, the interpretation of the disclosure described in the section of the means for solving the problem should be performed based on the description in the section, and the embodiments are only specific examples of the disclosure described in the section of the means for solving the problem.

Although the present disclosure has been described above using the embodiment, the present disclosure is not limited to the embodiment in any way, and may be implemented in various modes without departing from the scope of the present disclosure.

The present disclosure is applicable to a manufacturing industry of a hybrid electric vehicle and the like.

What is claimed is:

1. A hybrid electric vehicle comprising:
   an engine configured to output power for traveling;
   a motor configured to output power for traveling;
   an energy storage device configured to supply and receive electric power to and from the motor; and
   a control device configured to perform drive assistance control when controlling the engine and the motor by switching between a motor drive mode in which the hybrid electric vehicle performs motor driving and a normal drive mode in which the hybrid electric vehicle performs normal driving, the motor driving being driving in which the hybrid electric vehicle runs on the power from the motor with the engine stopped, the normal driving being driving in which the hybrid electric vehicle runs on the power from the engine and the power from the motor as necessary, the drive assistance control being control that causes the hybrid electric vehicle to travel based on a drive assistance plan in which the motor drive mode or the normal drive mode is assigned to each of travel sections of a travel route using information on the travel sections, and the travel route being a planned or estimated travel route based on map information and a location of the hybrid electric vehicle, wherein
   when the travel sections of the travel route include a specific travel section having a motor-driving designated point, the control device divides the specific travel section into two travel sections at the motor-driving designated point based on a predetermined condition and performs the drive assistance control, the motor-driving designated point being a point at which the hybrid electric vehicle is supposed to arrive by the motor driving.

2. The hybrid electric vehicle according to claim 1, wherein the control device divides the specific travel section into two travel sections at the motor-driving designated point when a first condition is satisfied as the predetermined condition, the first condition being that the motor-driving designated point is a set or estimated destination or additional destination.

3. The hybrid electric vehicle according to claim 2, wherein the control device sets a first travel section of the two travel sections of the specific travel section as a motor drive section when the first condition is satisfied as the predetermined condition.

4. The hybrid electric vehicle according to claim 1, wherein the control device does not divide the specific travel section at the motor-driving designated point when a second condition is satisfied as the predetermined condition, the second condition being that the motor-driving designated point is an intermediate waypoint before a set destination.

5. The hybrid electric vehicle according to claim 4, wherein the control device performs the drive assistance control without using the specific travel section as a motor drive section when the second condition is satisfied as the predetermined condition.

* * * * *